Sept. 17, 1968     J. J. FITZGERALD     3,402,311
GAS ATMOSPHERE COUNTER ELECTRODE
Filed Feb. 1, 1966
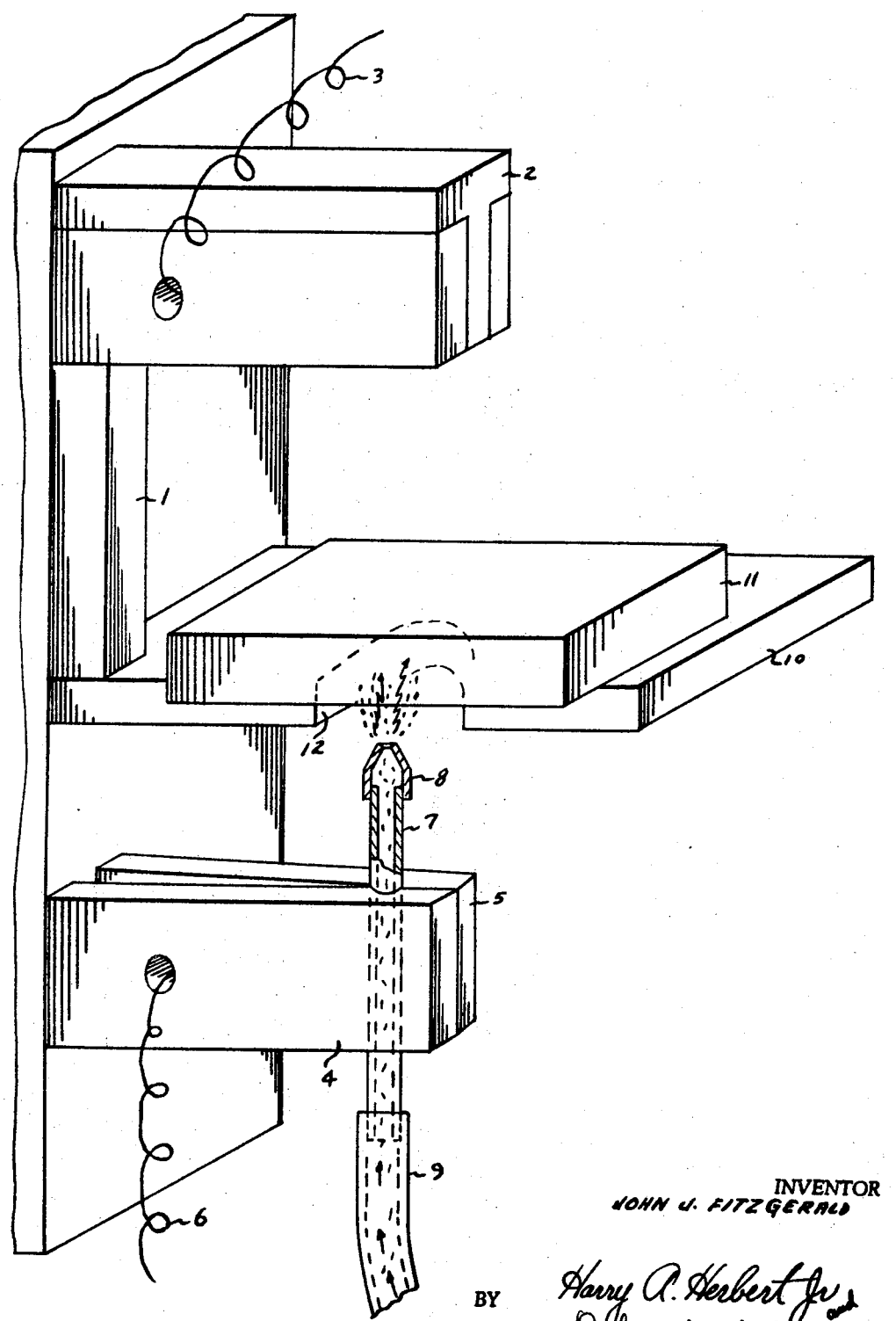
INVENTOR
JOHN J. FITZGERALD
BY
ATTORNEYS United States Patent Office 3,402,311
Patented Sept. 17, 1968

3,402,311
GAS ATMOSPHERE COUNTER ELECTRODE
John J. Fitzgerald, Chelmsford, Mass., assignor to the United States of America as represented by the Secretary of the Air Force
Filed Feb. 1, 1966, Ser. No. 524,355
4 Claims. (Cl. 313—231)

ABSTRACT OF THE DISCLOSURE

In an A.C. spark excitation system used for the spectral analysis of samples of unknowns, the counter electrode has a hollow support rod and a hollow disposable tip electrode. An inert gas such as argon may therefore be supplied to the spark gap between the counter electrode and the sample through the hollow support rod and tip electrode.

---

The invention described herein may be manufactured and used by or for the Government for governmental purposes without the payment to me of any royalty thereon.

This invention concerns a gas atmosphere counter electrode emission spectograph apparatus that has a controlled angle of incidence; that minimizes contamination; and that provides a conveniently controlled sample enclosing gas envelope that protectively isolates the sample during the taking of spectrographic readings therefrom.

The gas atmosphere counter electrode that is contemplated hereby operates in an arc stand of an emission spectrograph used in spectrochemical analysis of a sample material. The emissivity of the sample material is the ratio of the emissive power of a radiation surface to the emissive power of a black body at the same temperature. The emission spectrum displays the radiations emitted by a substance at a prescribed temperature.

The environment within which this invention occurs is presented in the literature in Methods for Emission Spectrochemical Analysis, published in 1964 by The American Society for Testing and Materials, fourth edition, Philadelphia, Pa., at pp. 41–45, 91, 181, 295, etc., with earlier graphite electrodes described at pages 108 et seq., and suitable definitions beginning at p. 117. Matrix effects that are of interest to this invention with iron and silicon, together in samples with and without sodium sulfate, are described beginning at p. 228 of an earlier 1959 Symposium on Spectroscopy as Technical Publication No. 269 from the same publishers. A Practical Handbook on Spectral Analysis by Burakov and Yankovskii was published in 1964 by The MacMillan Company of New York, is of interest in spectral analysis theory and operation.

The objects of the present invention are to provide a new and improved apparatus assembly in accomplishing the emission spectrochemical analysis of unknown samples on photographic film with a controlled angle of incidence between a counter electrode over a greater range than has been available heretofore with previously manufactured comparable equipment and illustratively using an alternating current spark excitation of the sample.

A further object of the present invention is the provision of a direct flow of minimum quantities of a desired gas of optimum purity through the center aperture in the counter electrode tip against the sample, rather than enclosing the electrode within a chamber in accomplishing comparable results.

Another object is to provide a new and improved apparatus for use in the analysis of emission spectroscopy for the determination of trace elements in electronic materials. An illustrative example is a determination of chromium in aluminum oxide where cyanogen bands interfere in the determination unless suppressed by the use of the apparatus embodying the present invention.

Another object is the provision of a simple, convenient and economical solution to the problem of using an alternating current spark excitation in gas atmospheres of samples to be analyzed. The new apparatus eliminates the possibility of contaminating the spectra by sparking the metal surface of a sample enclosing chamber.

This gas atmosphere counter electrode provides the desired inert atmosphere for the spectrochemical analysis of samples of unknowns which is only accomplished in other systems by the use of a much larger chamber. Commercially available comparable chambers are made of stainless steel, plastics, or the like, and bathe the edges of the counter electrode in a desired atmosphere. These earlier chambers, that cost up to about one hundred times greater equipment expense, require a gas flow rate of about 10 liters per minute to yield the same results that are provided by the gas atmosphere of the present invention using the counter electrode that is disclosed herein in high purity and using much smaller quantities of gas. The expenditure for the volume of high purity inert gas, such as argon, for example, that is used for the gas atmosphere counter electrode that is disclosed herein, is approximately 5% of the expenditure for the volume of gas that is consumed by gas flow through chambers that have been commercially available heretofore.

In the single figure of the accompanying drawing is shown in elevation a fragmentary assemblage of a Petrey spark stand comprising a support 1 from which extend laterally an upper electrode jaw 2 and a lower electrode jaw spring-loaded clip comprising a pair of arms 4 and 5. The upper jaw 2 is connected electrically with an upper electrode lead 3 from an alternating current power supply, not shown. The lower jaw arms 4 and 5 are connected electrically with a lower electrode lead 6 from the alternating current power supply.

The apparatus of the present invention provides an axially hollow electrode tip collar support tube 7 that carries at its upper end a removable and disposable electrode tip collar 8. The collar 8 shown has a hollow frusto-conical shape over both its inner and outer surfaces. The collar 8 fits snugly over the upper end of the tube 7 to minimize gas loss therebetween. For a ¼" outside diameter tube, the gas orifice in the upper end of the collar 8 illustratively is 0.040 inch in diameter. An electrically nonconducting gas supply tubing 9 is attached in a desired manner to the lower end of the tube 7. The tube 9 supplies a desired gas such as argon, at a flow rate controlled by a valve, not shown, at the open upper end of the electrode tip collar 8.

The Petrey stand sample supporting spark stand electrode 10 extends in a cantilever mount from the stand support 1. A block of sample material 11 that is to be analyzed spectrographically as described in the cited texts, rests on the upper surface of the sample supporting electrode 10. The spark stand electrode 10 is cut away at 12 to permit an ample area for a desired alternating current spark action during the analysis of the sample between the outlet orifice tip of the electrode tip collar 8 and the lower surface of the sample 11. The spark stand electrode 10 in this manner positions the sample 11 in opposition to and adjustably spaced from the upper end of the counter electrode collar 8. The collar 8 preferably is made of graphite or of carbon.

Black graphite deposits are observed around the sparked sample area when the gas atmosphere counter electrode collar 8 is used. This indicates that the inert gas sheath has shielded the spark during exposure.

The use of the apparatus shown in the accompanying drawing in the making of an emission spectrochemical analysis of the unknown sample 11, begins with the adjustment to a predetermined value measured by a suitable gauge of the space separating the upper end of the collar 8 from the lower surface of the sample specimen 11.

The gas supply is turned on and the meter indicated gas flow rate is adjusted to about 0.5 liter per minute. The A.C. spark circuit is then activated and a spark is maintained between the tip or upper end of the collar 8 and the lower surface of the sample 11.

With the gas atmosphere counter electrode collar 8 in use, the A.C. spark is sheathed within the argon inert gas. The sheathed spark prevents the formation of oxides at the spark contacted surface of the sample and also decreases the amount of cyanogen ($N\equiv CC\equiv N$) radiation which reaches the detection system that is employed in the spectograph, not shown.

In addition, the inert gas sheath between the upper tip of the collar 8 and the lower surface of the sample 11 permits the emission of lines with higher excitation potential which are not available when the spark is maintained in air.

The most advantageous result of inert gas A.C. spark excitation of samples over air is that matrix effects are minimized. This permits the use of analytical working curves over a wide range of concentration, i.e., the same analytical curves for nickel in iron may be used if the iron concentration by weight varies from 5 through 95%. This is not possible when air A.C. spark excitation is used.

Now, after appropriate exposure, the A.C. circuit is turned off, the contaminated electrode tip or collar 8 is removed and is replaced by a fresh collar, and the whole operation is ready to be repeated.

When this electrode collar 8 is used for sparking iron samples with argon gas fed to the lower end of the tube 7, iron lines having excitation potentials in excess of 15 electron volts are observed on spectrograms obtained from the use of the apparatus. A smooth exponential type plot of the iron lines 3009.57 A. and 2819.33 A. is obtained. This does not occur in air from alternating current spark excitation. The transmission of the cyanogen band head at 3590.4 A. is reduced from 5% transmission of the photographic plate in air to 75% transmission in argon, when the gas atmosphere counter electrode tip collar 8 that is disclosed herein is used.

A spectroscope spreads individual wave lengths in a spectrum dispersion or in an array of electromagnetic radiation. The resulting spectra are distinctive of elements and of compounds and hence are used in their identification in the quick analysis of unknowns in their gaseous phase.

It is to be understood that the apparatus and use that are disclosed herein of the present invention are submitted as being illustrative examples of a successfully operative embodiment of the present invention and that similarly operative modifications may be made therein without departing from the scope of the present invention.

I claim:

1. In a spark excitation system for use in an A.C. emission spectrographic apparatus having means for supporting a sample to be analyzed, means for positioning a counter electrode adjacent the sample and adapted to form a spark gap between the sample and the counter electrode, lead means for supplying an A.C. voltage to the sample and counter electrode and means for supplying an inert atmosphere to the spark gap, the improvement wherein the counter electrode comprises a hollow support rod; whereby the inert gas may be conducted to the spark gap through the rod and a removable apertured tip mounted on the spark gap end of said support rod.

2. The device as recited in claim 1 wherein said apertured tip has a substantially frusto-conical shape over both its inner and outer surfaces adjacent the aperture.

3. The device as recited in claim 2 wherein the aperture is of the order of 0.040 inch in diameter.

4. The device as recited in claim 3 wherein the tip has a composition selected from the group that consists of graphite and carbon.

References Cited

UNITED STATES PATENTS 3,248,592   4/1966   Garbini et al. _____ 313—357 X

OTHER REFERENCES

Boyd, Controlled Atmosphere Excitation in Non-Enclosed Spark Stands, January 1965, Applied Spectroscopy, pp. 22–25.

Thiers, The Advantages of Controlled Atmospheres for Arc Spectroscopy, November 1953, Applied Spectroscopy, pp. 157–163.

U.C.P. Spectrographic Electrodes, 1955 p. 17.

JAMES W. LAWRENCE, *Primary Examiner.*

R. JUDD, *Assistant Examiner.*